United States Patent
Bennett et al.

(10) Patent No.: US 11,592,613 B2
(45) Date of Patent: Feb. 28, 2023

(54) MULTICORE OPTICAL FIBER

(71) Applicant: CORNING INCORPORATED, Corning, NY (US)

(72) Inventors: Kevin Wallace Bennett, Hammondsport, NY (US); Scott Robertson Bickham, Corning, NY (US); Ming-Jun Li, Horseheads, NY (US); Pushkar Tandon, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 0 days.

(21) Appl. No.: 17/381,835

(22) Filed: Jul. 21, 2021

(65) Prior Publication Data

US 2022/0026628 A1 Jan. 27, 2022

Related U.S. Application Data

(60) Provisional application No. 63/054,941, filed on Jul. 22, 2020.

(51) Int. Cl.
*G02B 6/02* (2006.01)
*G02B 6/028* (2006.01)
*G02B 6/036* (2006.01)

(52) U.S. Cl.
CPC ....... *G02B 6/02042* (2013.01); *G02B 6/0281* (2013.01); *G02B 6/0288* (2013.01); *G02B 6/036* (2013.01); *G02B 6/0365* (2013.01)

(58) Field of Classification Search
CPC .............. G02B 6/02042; G02B 6/0281; G02B 6/0288; G02B 6/036; G02B 6/0365
See application file for complete search history.

(56) References Cited

U.S. PATENT DOCUMENTS

| | | | |
|---|---|---|---|
| 9,529,144 B2 * | 12/2016 | Ishida | ................. G02B 6/02 |
| 9,529,146 B2 * | 12/2016 | Ishida | ............... G02B 6/02042 |
| 9,547,122 B2 | 1/2017 | Hayashi | |
| 9,726,816 B2 * | 8/2017 | Hayashi | ............... G02B 6/3863 |
| 9,891,378 B2 * | 2/2018 | Imamura | ........... C03B 37/01222 |
| 10,001,597 B2 * | 6/2018 | Bennett | ................ G02B 6/0281 |
| 2011/0052129 A1 | 3/2011 | Sasaoka | |
| 2012/0230640 A1 | 9/2012 | Hayashi | |

(Continued)

OTHER PUBLICATIONS

International Search Report and Written Opinion of the International Searching Authority; PCT/US2021/042513; dated Sep. 15, 2021; 11 pages; European Patent Office.

(Continued)

*Primary Examiner* — Ryan A Lepisto

(57) ABSTRACT

Multicore optical fibers with low bend loss, low cross-talk, and large mode field diameters In some embodiments a circular multicore optical fiber includes a glass matrix; at least 3 cores arranged within the glass matrix, wherein any two cores have a core center to core center spacing of less than 29 microns; and a plurality of trench layers positioned between a corresponding core and the glass matrix, each trench layer having an outer radius of less than or equal to 14 microns and a trench volume of greater than 50% Δ micron$^2$; wherein the optical fiber has a mode field diameter of greater than about 8.2 microns at 1310 nm, and wherein the optical fiber has an outer diameter of less than about 130 microns.

22 Claims, 10 Drawing Sheets

(56) References Cited

U.S. PATENT DOCUMENTS

| | | |
|---|---|---|
| 2013/0170804 A1 | 7/2013 | Hayashi |
| 2015/0043878 A1 | 2/2015 | Chen |
| 2016/0062035 A1 | 3/2016 | Ishida |
| 2016/0187576 A1 | 6/2016 | Sasaki et al. |
| 2016/0209583 A1 | 7/2016 | Hayashi et al. |
| 2017/0363508 A1 | 12/2017 | Hayashi et al. |
| 2021/0003773 A1* | 1/2021 | Hayashi ............ G02B 6/036 |

OTHER PUBLICATIONS

Hayashi et al., "Design and fabrication of ultra-low crosstalk and low-loss multi-core fiber", Optics Express, vol. 19, No. 17, Aug. 15, 2011, 17 pages.

Lukasz Szostkiewicz, et al., "Cross talk analysis in multicore optical fibers by supermode theory," Optics Letters, vol. 41, No. 16, published Aug. 15, 2016, pp. 3759-3762.

M. Koshiba, K. Saitoh, K. Takenaga, and S. Matsuo, "Analytical Expression of Average Power-Coupling Coefficients for Estimating Intercore Crosstalk in Multicore fibers," IEEE Photonics J., 4(5), pp. 1987-1995 (2012).

M. Li, et al., "Coupled Mode Analysis of Crosstalk in Multicore fiber with Random Perturbations," in Optical Fiber Communication Conference, OSA Technical Digest (online),Optical Society of America, 2015, paper W2A.35, 3 pages.

Shoichiro Matsuo, et al., "Crosstalk behavior of cores in multi-core portion under bent condition," IEICE Electronics Express, vol. 8, No. 6, published Mar. 25, 2011, pp. 385-390.

Single Mode FiberOptics, Jeunhomme, pp. 39-44, Marcel Dekker, New York, 1990.

T. Hayashi, T. Sasaki, E. Sasaoka, K. Saitoh, and M. Koshiba, "Physical Interpretation of Intercore Crosstalk in Multicore fiber: Effects of Macrobend, Structure Fluctuation, and Microbend," Optics Express, 21(5), 5401-12 (2013).

* cited by examiner

MULTICORE OPTICAL FIBER

CROSS-REFERENCE TO RELATED APPLICATIONS

This application claims the benefit of priority under 35 U.S.C. § 119 of U.S. Provisional Application Ser. No. 63/054,941 filed on Jul. 22, 2020, the content of which is relied upon and incorporated herein by reference in its entirety.

FIELD

The present disclosure relates to multicore optical fibers, and in particular to multicore optical fibers with low bend loss, low cross-talk, and large mode field diameters.

BACKGROUND

Multicore optical fibers are optical fibers that include a plurality of cores embedded in a cladding matrix.

Multicore fibers are attractive for a number of applications, including their use for increasing fiber density to overcome cable size limitations and duct congestion issues in passive optical network ("PON") systems. Their use is also attractive in high speed optical interconnects, where there is a need to increase the fiber density to achieve compact high fiber count connectors. For high performance of multicore fibers, it is necessary that they have low loss, low bend-loss, low cross-talk and large mode field that is matched well to standard single mode fiber.

Accordingly, the inventors have developed improved multicore fibers with low bend loss, low cross-talk, and large mode field diameters.

SUMMARY

In a first embodiment disclosed herein a circular multicore optical fiber includes: a glass matrix having a front endface, a back endface, a length, a refractive index $n_{20}$, and a central axis; at least 3 cores arranged within the glass matrix, each core having a center positioned along at least one diameter of the glass matrix and wherein any two cores have a core center to core center spacing of less than 29 microns, wherein the cores are positioned generally parallel to the central axis between the front and back endfaces and having respective refractive indices $n_{50}$, wherein $n_{50} > n_{20}$, wherein each core and the glass matrix define a waveguide; and a plurality of trench layers, wherein each trench layer is positioned between a corresponding core and the glass matrix, each trench layer having an outer radius of less than or equal to 14 microns and a trench volume of greater than 50% $\Delta$ micron$^2$; wherein the optical fiber has a mode field diameter of greater than about 8.2 microns at 1310 nm, and wherein the optical fiber has an outer diameter of less than about 130 microns.

A second embodiment of the present disclosure may include the first embodiment, wherein the optical fiber comprises 4 cores and wherein the center of each core is positioned along a first diameter of the glass matrix.

A third embodiment of the present disclosure may include the first embodiment, wherein the optical fiber comprises 5 cores and wherein the center of a first core and a second core are positioned along a first diameter of the glass matrix and wherein the center of a third core and a fourth core are positioned along a second diameter of the glass matrix perpendicularly intersecting the first diameter, and wherein the center of a fifth core is positioned at the intersection of the first diameter and the second diameter.

A fourth embodiment of the present disclosure may include the first to third embodiment, wherein the optical fiber has a diameter of about 125 microns.

A fifth embodiment of the present disclosure may include the first to fourth embodiment, wherein the plurality of cores is at least 4 cores.

A sixth embodiment of the present disclosure may include the first to fourth embodiment, wherein the plurality of cores is at least 8 cores.

A seventh embodiment of the present disclosure may include the first to sixth embodiment, wherein a diameter of each core is about 5 microns to about 27 microns.

An eight embodiment of the present disclosure may include the first to seventh embodiment, wherein the optical fiber has a mode field diameter greater than 8.5 microns at 1310 nm.

An ninth embodiment of the present disclosure may include the first to seventh embodiment, wherein the optical fiber has a mode field diameter greater than 8.6 microns at 1310 nm.

A tenth embodiment of the present disclosure may include the first to ninth embodiment, wherein the outer radius of each trench layer is less than or equal to about 13 microns.

An eleventh embodiment of the present disclosure may include the first to ninth embodiment, wherein the outer radius of each trench layer is less than or equal to about 12.5 microns.

A twelfth embodiment of the present disclosure may include the first to eleventh embodiment, wherein the trench volume is greater than 55% $\Delta$ micron$^2$.

A thirteenth embodiment of the present disclosure may include the first to eleventh embodiment, wherein the trench volume is greater than 60% $\Delta$ micron$^2$.

A fourteenth embodiment of the present disclosure may include the first to eleventh embodiment, wherein the trench volume is greater than 65% $\Delta$ micron$^2$.

A fifteenth embodiment of the present disclosure may include the first to fourteenth embodiment, wherein a distance from an edge of the core to an edge of the glass matrix is 4 microns or less.

A sixteenth embodiment of the present disclosure may include the first to fourteenth embodiment, wherein a distance from an edge of the core to an edge of the glass matrix is 3.5 microns or less.

A seventeenth embodiment of the present disclosure may include the first to sixteenth embodiment, wherein a cross-talk of the optical fiber is less than about −30 dB.

An eighteenth embodiment of the present disclosure may include the first to sixteenth embodiment, wherein a cross-talk of the optical fiber is less than about −35 dB.

A nineteenth embodiment of the present disclosure may include the first to sixteenth embodiment, wherein a cross-talk of the optical fiber is less than about −40 dB.

A twentieth embodiment of the present disclosure may include the first to nineteenth embodiment, wherein a difference in loss at 1310 nm between any two cores within the glass matrix is less than about 0.1 dB/km.

A twenty-first embodiment of the present disclosure may include the first to twentieth embodiment, wherein a maximum loss at 1310 nm for each core within the glass matrix is about 0.32 dB/km to about 0.45 dB/km.

A twenty-second embodiment of the present disclosure may include the first to twenty-first embodiment, wherein a difference in the mode field diameter between any two cores within the glass matrix at 1310 nm is less than 0.3 microns.

Additional features and advantages are set forth in the Detailed Description that follows, and in part will be readily apparent to those skilled in the art from the description or recognized by practicing the embodiments as described in the written description and claims hereof, as well as the appended drawings. It is to be understood that both the foregoing general description and the following Detailed Description are merely exemplary, and are intended to provide an overview or framework to understand the nature and character of the claims.

BRIEF DESCRIPTION OF THE DRAWINGS

The accompanying drawings are included to provide a further understanding, and are incorporated in and constitute a part of this specification. The drawings illustrate one or more embodiment(s), and together with the Detailed Description serve to explain principles and operation of the various embodiments. As such, the disclosure will become more fully understood from the following Detailed Description, taken in conjunction with the accompanying Figures, in which.

DETAILED DESCRIPTION

Figure 1:
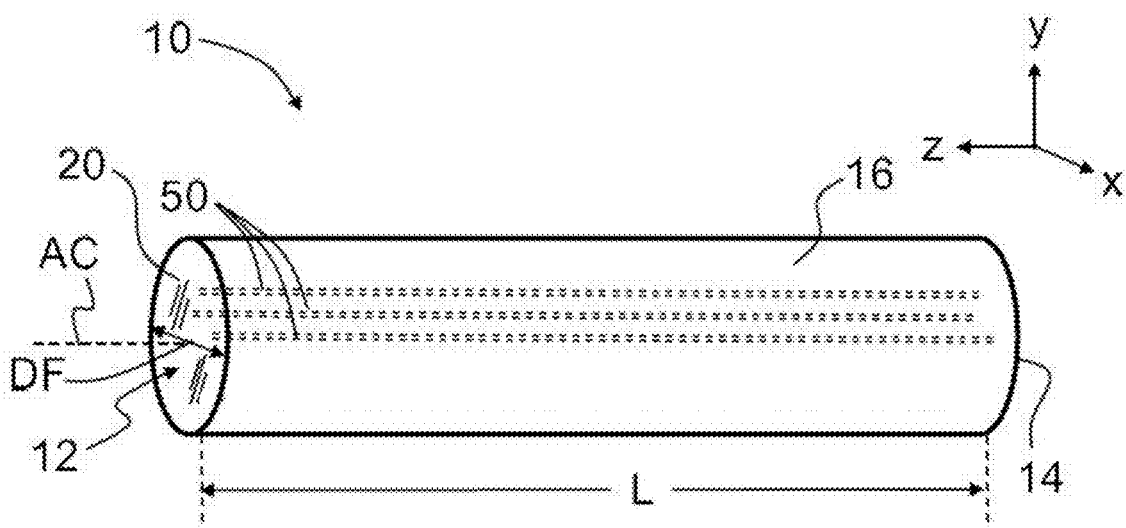
FIG. 1 is a front isometric view of an example multicore optical fiber ("multicore fiber") in accordance with some embodiments of the present disclosure.

Reference is now made in detail to various embodiments of the disclosure, examples of which are illustrated in the accompanying drawings. Whenever possible, the same or like reference numbers and symbols are used throughout the drawings to refer to the same or like parts. The drawings are not necessarily to scale, and one skilled in the art will recognize where the drawings have been simplified to illustrate the key aspects of the disclosure.

The claims as set forth below are incorporated into and constitute part of this Detailed Description.

In this document, relational terms, such as first and second, top and bottom, and the like, are used solely to distinguish one entity or action from another entity or action, without necessarily requiring or implying any actual such relationship or order between such entities or actions.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

"Radial position" and/or "radial distance," when used in reference to the radial coordinate "r" refers to radial position relative to the centerline (r=0) of each individual core portion in a multicore optical fiber. "Radial position" and/or "radial distance," when used in reference to the radial coordinate "R" refers to radial position relative to the centerline (R=0, central fiber axis) of the multicore optical fiber.

The length dimension "micrometer" may be referred to herein as micron (or microns) or µm.

As used herein, the "refractive index profile" is the relationship between refractive index or relative refractive index and radial distance r from the core portion's centerline for each core portion of the multicore optical fiber. For relative refractive index profiles depicted herein as relatively sharp boundaries between various regions, normal variations in processing conditions may result in step boundaries at the interface of adjacent regions that are not sharp. It is to be understood that although boundaries of refractive index profiles may be depicted herein as step changes in refractive index, the boundaries in practice may be rounded or otherwise deviate from perfect step function characteristics. It is further understood that the value of the relative refractive index may vary with radial position within the core region and/or any of the cladding regions. When relative refractive index varies with radial position in a particular region of the fiber (core region and/or any of the cladding regions), it may be expressed in terms of its actual or approximate functional dependence or in terms of an average value applicable to the region. Unless otherwise specified, if the relative refractive index of a region (core region and/or any of the inner and/or common cladding regions) is expressed as a single value, it is understood that the relative refractive index in the region is constant, or approximately constant, and corresponds to the single value or that the single value represents an average value of a non-constant relative refractive index dependence with radial position in the region. Whether by design or a consequence of normal manufacturing variability, the dependence of relative refractive index on radial position may be sloped, curved, or otherwise non-constant.

The "relative refractive index" or "relative refractive index percent" as used herein with respect to multicore optical fibers and fiber cores of multicore optical fibers is defined according to equation (1):

$$\Delta\% = 100\frac{n^2(r) - n_c^2}{2n^2(r)} \tag{1}$$

where n(r) is the refractive index at the radial distance r from the core's centerline at a wavelength of 1550 nm, unless otherwise specified, and $n_c$ is 1.444, which is the refractive index of undoped silica glass at a wavelength of 1550 nm. As used herein, the relative refractive index is represented by $\Delta$ (or "delta") or $\Delta\%$ (or "delta %") and its values are given in units of "%" or "% $\Delta$", unless otherwise specified. Relative refractive index may also be expressed as $\Delta(r)$ or $\Delta(r)\%$. When the refractive index of a region is less than the reference index $n_c$, the relative refractive index is negative and can be referred to as a trench. When the refractive index of a region is greater than the reference index $n_c$, the relative refractive index is positive, and the region can be said to be raised or to have a positive index.

The average relative refractive index of a region of the multicore optical fiber can be defined according to equation (2):

$$\Delta\% = \frac{\int_{r_{inner}}^{r_{outer}} \Delta(r) dr}{(r_{outer} - r_{inner})} \quad (2)$$

where $r_{inner}$ is the inner radius of the region, $r_{outer}$ is the outer radius of the region, and $\Delta(r)$ is the relative refractive index of the region.

The term "α-profile" (also referred to as an "alpha profile") refers to a relative refractive index profile of the region (e.g., core region), expressed in terms of $\Delta(r)$ which is in units of "%", where r is radius. The α-profile of the core (which is defined by the core alpha, or alpha$_{core}$ herein) follows the equation (3), $$\Delta(r) = \Delta(r_0)\left\{1 - \left[\frac{|r - r_0|}{(r_1 - r_0)}\right]^\alpha\right\} \quad (3)$$

where $r_0$ is the point at which $\Delta(r)$ is maximum, $r_1$ is the point at which $\Delta(r)$ is zero, and r is in the range $r_1 \leq r \leq r_f$, where $r_1$ is the initial point of the α-profile, $r_f$ is the final point of the α-profile, and α is a real number. In some embodiments, examples shown herein can have a core alpha of $1 \leq \alpha \leq 100$. In practice, an actual optical fiber, even when the target profile is an alpha profile, some level of deviation from the ideal configuration can occur. Therefore, the alpha parameter for an optical fiber may be obtained from a best fit of the measured index profile, as is known in the art.

The term "graded-index profile" refers to an α-profile, where α<10. The term "step-index profile" refers to an α-profile, where α≥10.

The theoretical fiber cutoff wavelength, or "theoretical fiber cutoff", or "theoretical cutoff", for a given mode, is the wavelength above which guided light cannot propagate in that mode. A mathematical definition can be found in Single Mode Fiber Optics, Jeunhomme, pp. 39-44, Marcel Dekker, New York, 1990 wherein the theoretical fiber cutoff is described as the wavelength at which the mode propagation constant becomes equal to the plane wave propagation constant in the outer cladding. This theoretical wavelength is appropriate for an infinitely long, perfectly straight fiber that has no diameter variations.

Fiber cutoff is measured by the standard 2 m fiber cutoff test, FOTP-80 (EIA-TIA-455-80), to yield the "fiber cutoff wavelength", also known as the "2 m fiber cutoff" or "measured cutoff". The FOTP-80 standard test is performed to either strip out the higher order modes using a controlled amount of bending, or to normalize the spectral response of the fiber to that of a multimode fiber.

The bend resistance of an optical fiber, expressed as "bend loss" herein, can be gauged by induced attenuation under prescribed test conditions as specified by the IEC-60793-1-47:2017 standard, "Optical fibres—Part 1-47: Measurement methods and test procedures—Macrobending loss." For example, the test condition can entail deploying or wrapping the fiber one or more turns around a mandrel of a prescribed diameter, e.g., by wrapping 1 turn around either a 15 mm, 20 mm, or 30 mm or similar diameter mandrel (e.g. "1×15 mm diameter bend loss" or the "1×20 mm diameter bend loss" or the "1×30 mm diameter bend loss") and measuring the increase in attenuation per turn.

The term "attenuation," as used herein, is the loss of optical power as the signal travels along the optical fiber. Attenuation is measured as specified by the IEC 60793-1-40:2019 standard entitled "Optical fibres—Part 1-40: Attenuation measurement methods."

An "up-dopant" is a substance added to the glass of the component being studied that has a propensity to raise the refractive index relative to pure undoped silica. A "down-dopant" is a substance added to the glass of the component being studied that has a propensity to lower the refractive index relative to pure undoped silica. Examples of up-dopants include $GeO_2$ (germania), $Al_2O_3$, $P_2O_5$, $TiO_2$, Cl, Br, and alkali metal oxides, such as $K_2O$, $Na_2O$, $Li_2O$, $Cs_2O$, $Rb_2O$, and mixtures thereof. Examples of down-dopants include fluorine and boron.

The term "crosstalk" in a multi-core optical fiber is a measure of how much power leaks from one core portion to another, adjacent core portion. As used herein, the term "adjacent core portion" refers to the core that is nearest to the reference core portion. In embodiments, all core portions may be equally spaced from one another, meaning that all core portions are adjacent one another. In other embodiments, the core portions may not be equally spaced from one another, meaning that some core portions will be spaced further from the reference core portion than adjacent core portions are spaced from the reference core portion. The crosstalk can be determined based on the coupling coefficient, which depends on the refractive index profile design of the core portion, the distance between the two adjacent core portions, the structure of the cladding surrounding the two adjacent core portions, and Δβ, which depends on a difference in propagation constant β values between the two adjacent core portions (e.g., as described herein, two core portions having centerlines separated by a minimum core-to-core separation distance). For two adjacent core portions with power $P_1$ launched into the first core portion, then the power $P_2$ coupled from the first core portion to the second core portion can be determined from coupled mode theory using the following equation (4):

$$P_2 = \frac{L}{L_c}\left\langle\left(\frac{\kappa}{g}\right)^2 \sin^2(g\Delta L)\right\rangle P_1 \quad (4)$$

where $\langle\rangle$ denotes the average, L is fiber length, κ is the coupling coefficient between the electric fields of the two cores, ΔL is the length of the fiber, $L_c$ is the correlation length, and g is given by the following equation (5):

$$g^2 = \kappa^2 + \left(\frac{\Delta\beta}{2}\right)^2 \quad (5)$$

where Δβ is the mismatch in propagation constants between the LP01 modes in the two adjacent core portions when they are isolated. The crosstalk (in dB) is then determined using the following equation (6):

$$X = 10\log\left(\frac{P_2}{P_1}\right) = 10\log\left(\frac{L}{L_c}\left\langle\left(\frac{\kappa}{g}\right)^2 \sin^2(g\Delta L)\right\rangle\right) \quad (6)$$

The crosstalk between the two adjacent core portions increases linearly with fiber length in the linear scale (equation (5)) but does not increase linearly with fiber length in the dB scale (equation (7)). As used herein, crosstalk performance is referenced to a 100 km length L of optical fiber. However, crosstalk performance can also be represented with respect to alternative optical fiber lengths, with appropriate scaling. For optical fiber lengths other than 100 km, the crosstalk between cores can be determined using the following equation (7):

$$X(L) = X(100) + 10\log\left(\frac{L}{100}\right) \tag{7}$$

For example, for a 10 km length of optical fiber, the crosstalk can be determined by adding "−10 dB" to the crosstalk value for a 100 km length optical fiber. For a 1 km length of optical fiber, the crosstalk can be determined by adding "−20 dB" to the crosstalk value for a 100 km length of optical fiber.

Techniques for determining crosstalk between cores in a multicore optical fiber can be found in M. Li, et al., "Coupled Mode Analysis of Crosstalk in Multicore fiber with Random Perturbations," in Optical Fiber Communication Conference, OSA Technical Digest (online), *Optical Society of America*, 2015, paper W2A.35, and Shoichiro Matsuo, et al., "Crosstalk behavior of cores in multi-core portion under bent condition," *IEICE Electronics Express*, Vol. 8, No. 6, p. 385-390, published Mar. 25, 2011 and Lukasz Szostkiewicz, et al., "Cross talk analysis in multi-core optical fibers by supermode theory," *Optics Letters*, Vol. 41, No. 16, p. 3759-3762, published Aug. 15, 2016, the contents of which are all incorporated herein by reference in their entirety.

The phrase "coupling coefficient" $\kappa$, as used herein, is related to the overlap of electric fields when the two cores are close to each other. The square of the coupling coefficient, $\kappa^2$, is related to the average power in core m as influenced by the power in other cores in the multicore optical fiber. The "coupling coefficient" can be estimated using the coupled power theory, with the methods disclosed in M. Koshiba, K. Saitoh, K. Takenaga, and S. Matsuo, "Analytical Expression of Average Power-Coupling Coefficients for Estimating Intercore Crosstalk in Multicore fibers," IEEE Photonics J., 4(5), 1987-95 (2012); and T. Hayashi, T. Sasaki, E. Sasaoka, K. Saitoh, and M. Koshiba, "Physical Interpretation of Intercore Crosstalk in Multicore fiber: Effects of Macrobend, Structure Fluctuation, and Microbend," Optics Express, 21(5), 5401-12 (2013), the contents of which are incorporated by reference herein in their entirety.

"Trench volume" is defined as:

$$V_{Trench} = |2\int_{r_{Trench,inner}}^{r_{Trench,outer}} \Delta_{Trench}(r) r dr| \tag{8}$$

where $r_{Trench,inner}$ is the inner radius of the trench region of the refractive index profile, $r_{Trench,outer}$ is the outer radius of the trench region of the refractive index profile, $\Delta_{Trench}(r)$ is the relative refractive index of the trench region of the refractive index profile, and r is radial position in the fiber. Trench volume is in absolute value and a positive quantity and will be expressed herein in units of % $\Delta$micron$^2$, % $\Delta$-micron$^2$, % $\Delta$-μm$^2$, or % $\Delta$μm$^2$, whereby these units can be used interchangeably herein. A trench region is also referred to herein as a depressed-index cladding region and trench volume is also referred to herein as $V_3$.

The "mode field diameter" or "MFD" of an optical fiber is defined in Eq. (9) as:

$$MFD = 2w$$

$$w^2 = 2\frac{\int_0^\infty (f(r))^2 r dr}{\int_0^\infty \left(\frac{df(r)}{dr}\right)^2 r dr} \tag{9}$$

where f(r) is the transverse component of the electric field distribution of the guided optical signal and r is radial position in the fiber. "Mode field diameter" or "MFD" depends on the wavelength of the optical signal and is reported herein for wavelengths of 1310 nm, 1550 nm, and 1625 nm. Specific indication of the wavelength will be made when referring to mode field diameter herein. Unless otherwise specified, mode field diameter refers to the $LP_{01}$ mode at the specified wavelength.

"Effective area" of an optical fiber is defined in Eq. (10) as:

$$A_{eff} = \frac{2\pi\left[\int_0^\infty (f(r))^2 r dr\right]^2}{\int_0^\infty (f(r))^4 r dr} \tag{10}$$

where f(r) is the transverse component of the electric field of the guided optical signal and r is radial position in the fiber. "Effective area" or "$A_{eff}$" depends on the wavelength of the optical signal and is understood herein to refer to a wavelength of 1550 nm.

"Chromatic dispersion," herein referred to as "dispersion" unless otherwise noted, of an optical fiber is the sum of the material dispersion, the waveguide dispersion, and the inter-modal dispersion. "Material dispersion" refers to the manner in which the refractive index of the material used for the optical core affects the velocity at which different optical wavelengths propagate within the core. "Waveguide dispersion" refers to dispersion caused by the different refractive indices of the core and cladding of the optical fiber. In the case of single mode waveguide fibers, the inter-modal dispersion is zero. Dispersion values in a two-mode regime assume intermodal dispersion is zero. The zero dispersion wavelength ($\lambda_0$) is the wavelength at which the dispersion has a value of zero. Dispersion slope is the rate of change of dispersion with respect to wavelength. Dispersion and dispersion slope are reported herein at a wavelength of 1310 nm or 1550 nm, as noted, and are expressed in units of ps/nm/km and ps/nm$^2$/km, respectively. Chromatic dispersion is measured as specified by the IEC 60793-1-42:2013 standard, "Optical fibres—Part 1-42: Measurement methods and test procedures—Chromatic dispersion."

Directional terms as used herein—for example up, down, right, left, front, back, top, bottom—are made only with reference to the figures as drawn and are not intended to imply absolute orientation.

FIG. 1 is a schematic view of an exemplary multicore optical fiber according to some embodiments of the present disclosure. The multicore fiber 10 has a central axis AC (the centerline of the multicore optical fiber 10, shown running in the z-direction which defines radial position R=0), a front endface 12, a back endface 14 and an outer surface 16. The multicore fiber 10 has a diameter DF and an axial length L, which is measured between the front endface 12 and back endface 14. In some embodiments, the outer diameter DF of the optical fiber is less than about 160 microns, preferably less than about 130 microns, more preferably about 125 microns. In some embodiments, the outer diameter DF of the optical fiber is about 120 microns to about 130 microns.

The multicore fiber 10 includes a transparent dielectric matrix 20 in which is formed or embedded a plurality of cores portions 50 that run longitudinally, i.e., generally parallel to central axis AC, and that run between front endface 12 and back endface 14. In some embodiments, the central axis AC of multicore fiber 10 is also the central axis of glass matrix 20.

In some embodiments, the transparent dielectric matrix 20 is made of glass and so is referred to hereinafter as "glass matrix" 20. The core portion 50 of the optical fiber 10 reside completely within the glass matrix 20. Three cores 50 are shown in FIG. 1 for ease of illustration. In one embodiment of an exemplary multicore fiber 10, the cores 50 are made of solid material embedded in glass matrix 20, which serves as a common cladding to the cores, in which case the glass matrix is also referred to as a "cladding" 20 or a "common cladding" 20.

Cladding 20 has a refractive index $n_{20}$ while the cores 50 have a refractive index $n_{50}$, wherein $n_{50} > n_{20}$, so that the multiple cores and surrounding common cladding together define multiple waveguides WG (see FIG. 2), wherein the number of waveguides is the same as the number of cores.

Figure 2:
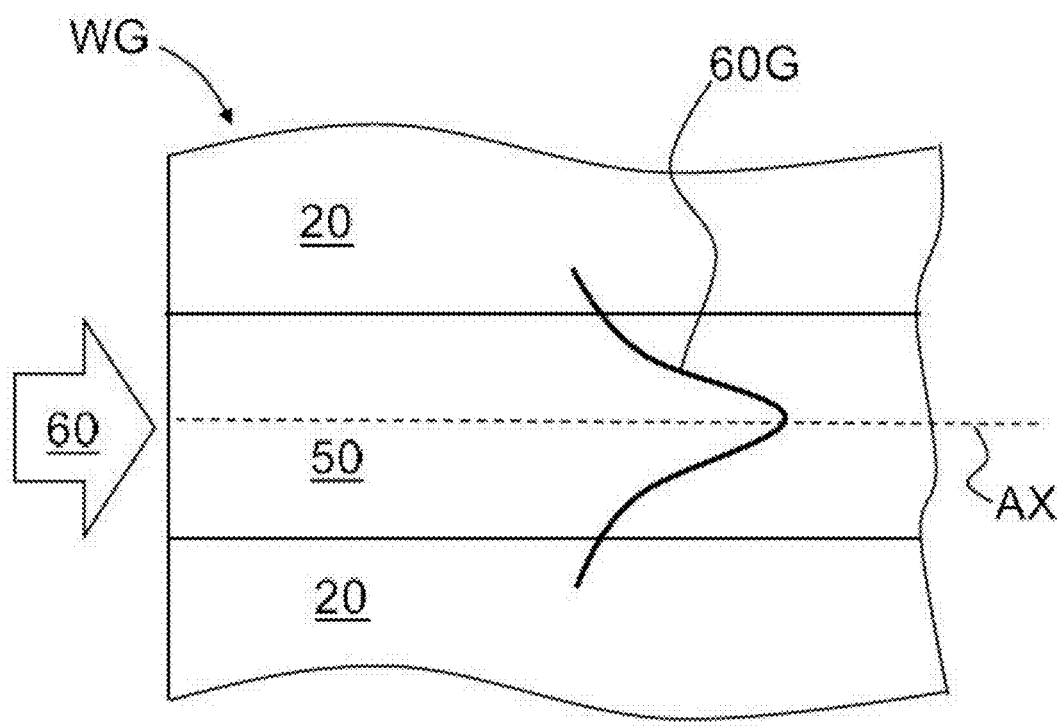
FIG. 2 is a close-up cross-sectional view of a portion of the multicore fiber of FIG. 1 at the front endface and showing one of the cores and the surrounding cladding that together define a waveguide, and also showing a guide mode traveling mainly within the core in accordance with some embodiments of the present.

FIG. 2 is a close-up cross-sectional view of a portion of multicore fiber 10 at front endface 12 showing one core 50 and the surrounding cladding 20, the combination of which defines waveguide WG. Light 60 is shown as being incident upon front endface 12 at core 50 and then traveling in waveguide WG as a guided wave (or "guided light" or "guided mode") 60G. The guided wave 60G travels mainly in core 50, with a small portion of the guided light traveling in cladding 20 just outside of the core as evanescent light. The representation of guided wave 60G can be thought of as an intensity profile of a single mode centered on a core axis AX.

In some embodiments, the cladding 20 and the cores 50 are configured so that the guided light 60G is single mode at an operating wavelength (i.e. the cutoff wavelength of each core is lower than the operating wavelength). In another example, cladding 20 and at least some of cores 50 are configured to support multiple guided modes 60G at an operating wavelength. For ease of discussion, the cores 50 are referred to being either a "single mode" or "multimode" even though it is the combination of cladding 20 and core 50 that defines the light-guiding properties of a given core of the multicore fiber 10. In an example, the operating wavelength is a visible wavelength while in another example the operating wavelength is one of the known telecommunication wavelengths (e.g., nominally about 850 nm, or about 1300 nm or about 1550 nm).

In an example, cladding 20 can be made of pure silica, while in another example cladding 20 includes an index-decreasing dopant such as fluorine or boron. In some embodiments, cores 50 can include an index-increasing dopant such as Ge, Ti, Al, P or Ta.

In some embodiments, the cores 50 need not all be identical, i.e., need not have all of the same properties. For example, cores 50 need not have the same refractive index $n_{50}$. Also in an example, cores 50 need not have the same refractive index profile, which in an example can be defined by an alpha parameter and one or more relative refractive index values (i.e., "deltas") as is known in the art.

The multicore fiber 10 has a cross-sectional area $A_{10}$ and is shown in the examples herein as having a circular cross-sectional shape. Other cross-sectional shapes besides circular (e.g., oval, rectangular, square, D-shape, etc.) can also be used. Each core 50 has a cross-sectional area $A_{50i}$, and the total area $A_T$ of the cores is the sum of the individual core areas, i.e., $A_T = \Sigma A_{50i}$. The total cross-sectional area of the cladding is $A_{20}$, while the effective area $A'_{20}$ is given by the cross-sectional area $A_{20}$ minus the total core area $A_{10}$, i.e., $A'_{20} = A_{20} - A_T$.

Figure 3:
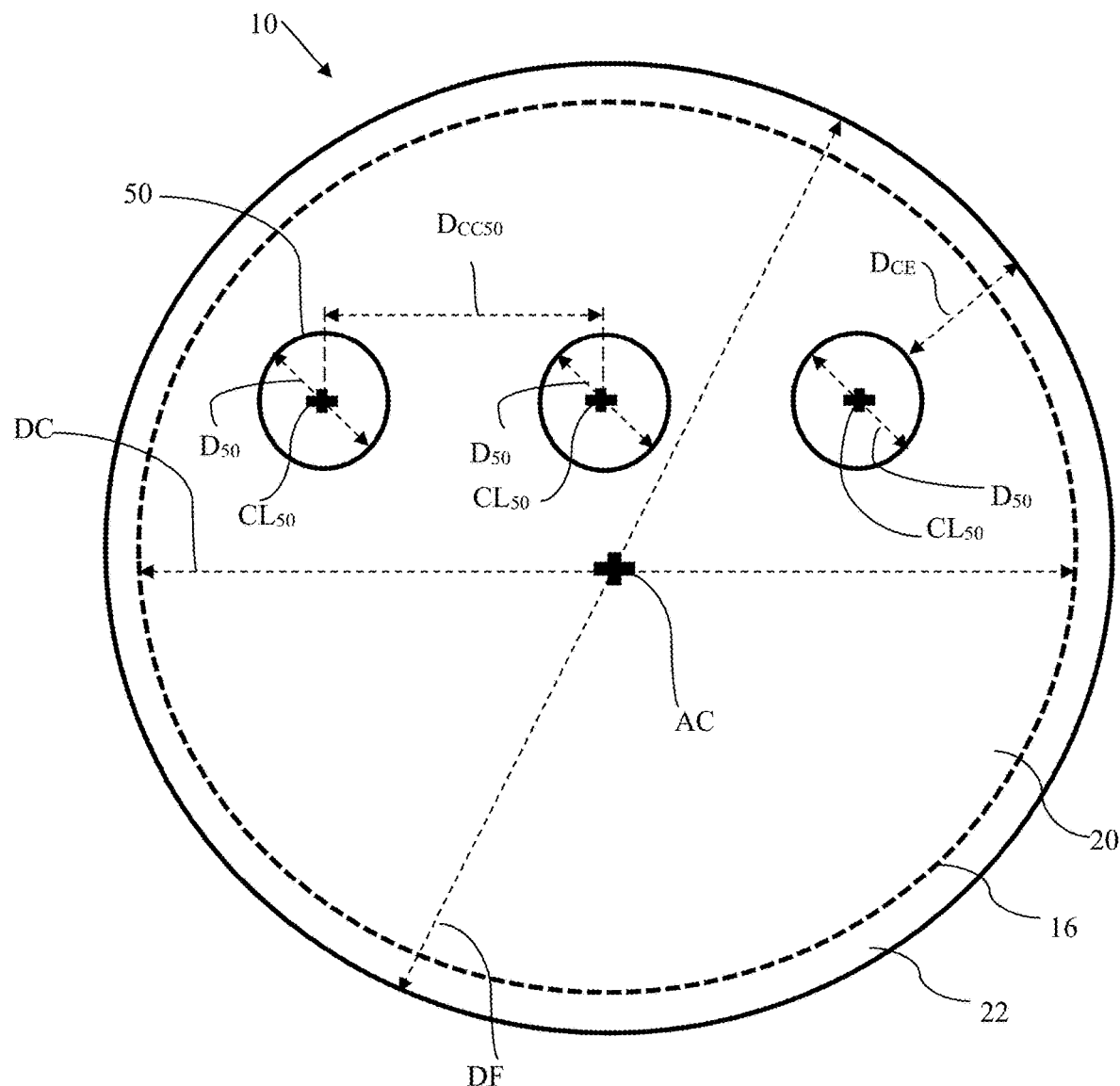
FIG. 3 is a schematic cross-sectional of an example multicore fiber that includes an outer cladding that surrounds the main cladding that encompasses the multiple cores in accordance with some embodiments of the present.

FIG. 3 is a cross-sectional view of an exemplary multicore fiber 10 taken in the x-y plane. FIG. 3 illustrates an embodiment wherein the multicore fiber includes an outer cladding layer ("outer cladding") 22 that surrounds the outer surface 16 of cladding 20. The outer cladding layer 22 can be employed to control the size of the cladding 20 and the multicore region defined thereby. The outer cladding 22 can be made of pure silica or doped silica. The multicore fiber 10 has a fiber diameter DF. The cladding 20 has a diameter DC. In some embodiments, the cladding diameter DC is 30 to 100 μm. Note that in the embodiment of FIG. 3, the cladding area $A_{20}$ is not the same as the fiber area $A_{10}$ because the fiber area includes the annular area of the outer cladding 22. Likewise, the cladding diameter DC is not the same as the fiber diameter DF. In embodiments without an outer cladding 22, the cladding area $A_{20}$ is the same as the fiber area $A_{10}$ and likewise the cladding diameter DC is the same as the fiber diameter DF. FIG. 3 depicts an embodiment having three cores 50 positioned in a single row (a 1 by 3 array) within the common cladding 20, with each core 50 generally extending through a length of the multicore optical fiber 110 parallel to the central fiber axis AC. Each core 50 includes a central axis or centerline $CL_{50}$ (which define radial position r=0 for each core portion) and a diameter $D_{50}$.

In some embodiments, as depicted in FIG. 3, cores 50 all have the same size, e.g., the same diameter $D_{50}$. The cores 50 may not have not have the same refractive index $n_{50}$ and may not have the same refractive index profile. In some embodiments, the diameter $D_{50}$ of each core 50 is about 5 microns to about 50 microns, preferably about 5 microns to about 27 microns.

The center-to-center spacing between any two adjacent core 50 is denoted by distance $D_{CC50}$. The core spacing affects the mode coupling strength and differential group delays (DGD). For identical cores, a larger spacing between the cores results in a weaker coupling effect and a smaller difference between the effective indices. In some embodiments, the distance $D_{CC50}$ is less than 29 microns. In some embodiments, the distance $D_{CC50}$ is greater than 10 microns. In some embodiments, the distance $D_{CC50}$ is greater than or equal to 10 microns and less than or equal to 29 microns. In some embodiments, the spacing $D_{CC50}$ is about the same for all adjacent cores.

In some embodiments, edges of the core portions 50 may also be spaced apart from the outer surface of the multicore optical fiber 10 by a core edge to fiber edge distance $D_{CE}$ as measured from the edge of each of the plurality of core portions 50 to the outer surface. The core edge to fiber edge distance $D_{CE}$ is the distance from a point along the outer circumference (e.g., a point on the outer circumference that is closest to the outer surface) of a core portion 50 to a nearest point along the circumference of the outer surface, as determined by a line segment between the point along the outer circumference of the core portion 40 and the nearest point along the circumference on the outer surface in a plan perpendicular to the fiber axis AC. In some embodiments, the distance $D_{CE}$ is 4 microns or less. In some embodiments, the distance $D_{CE}$ is 3.5 microns or less.

In some embodiments, the core diameters $D_{50}$ can be selected so that all of the cores are single mode. The number N of cores 50 arranged in the common cladding 20 can vary, with the maximum number $N_{MAX}$ being advantageously employed for applications where multicore fiber 10 is used for datacenter applications. The maximum number $N_{MAX}$ of cores 50 (as well as the maximum core density $\rho_{MAX}$) represents the most cores 50 that can fit within the common cladding 20 while satisfying the spacing condition for the desired coupling coefficient. The core density $\rho$ is the number N of cores per fiber area $A_F$ or cladding area $A_{20}$. In some embodiments, the number of cores N within the multicore fiber 10 is at least 3 cores. In some embodiments, the number of cores N within the multicore fiber 10 is at least 4 cores. In some embodiments, the number of cores N within the multicore fiber 10 is at least 8 cores. For multicore optical fibers, as more cores are added to the fiber while keeping the fiber diameter constant, for example at 125 microns, the distance between the cores impacts the fiber cross-talk and the distance between the edge of the cores and the fiber edge impacts tunneling loss.

Figure 7A:
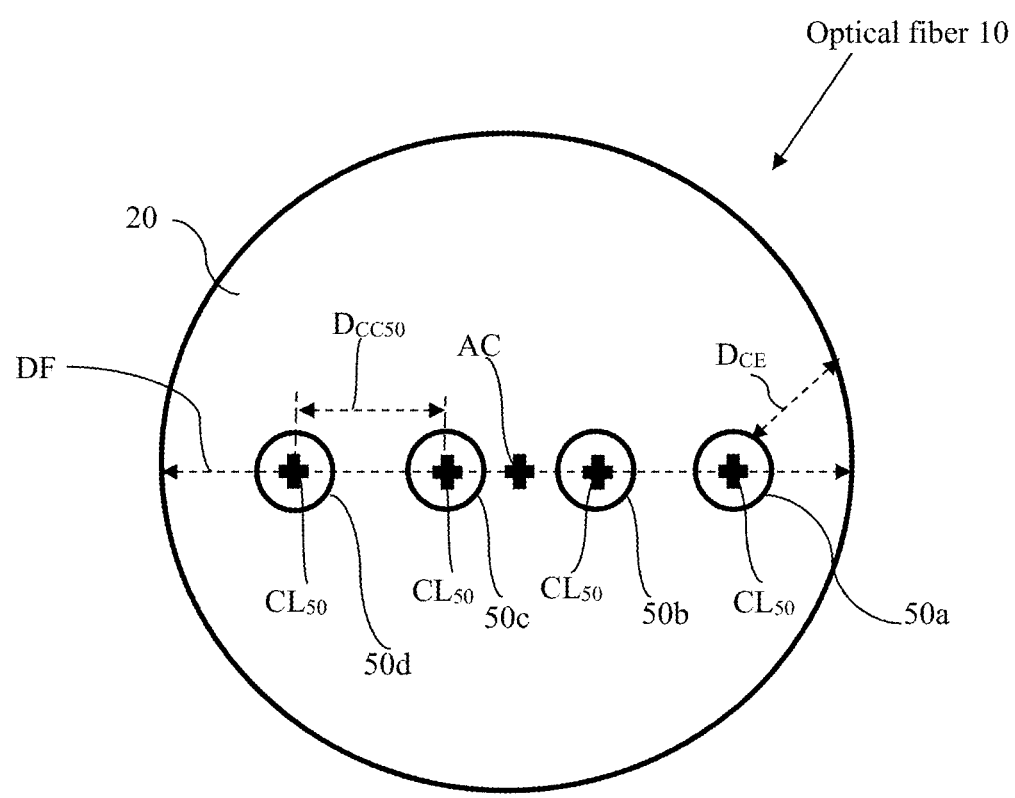
FIG. 7A-7C depict exemplary configurations of a multicore fiber in accordance with some embodiments of the current disclosure.

It should be appreciated that various numbers and arrangements of core portions for the multicore optical fiber 10 are contemplated and possible. For example, FIG. 7A depicts an alternative exemplary configuration of a multicore fiber 10 having four core portions 50 within the common cladding 20. In the embodiments depicted in FIG. 7A the 4 core portions 50 are positioned in a single row with the centerline $CL_{50}$ of each core 50 positioned along a diameter DF of the fiber 10, forming a one by four liner array of cores. The core portions 50 shown in FIG. 7A may be positioned in other suitable arrangements, for example but not limited to an arrangement where each core portion 50 is positioned at the corner of a square pattern formed around the central axis AC of the fiber 10.

Figure 7B:
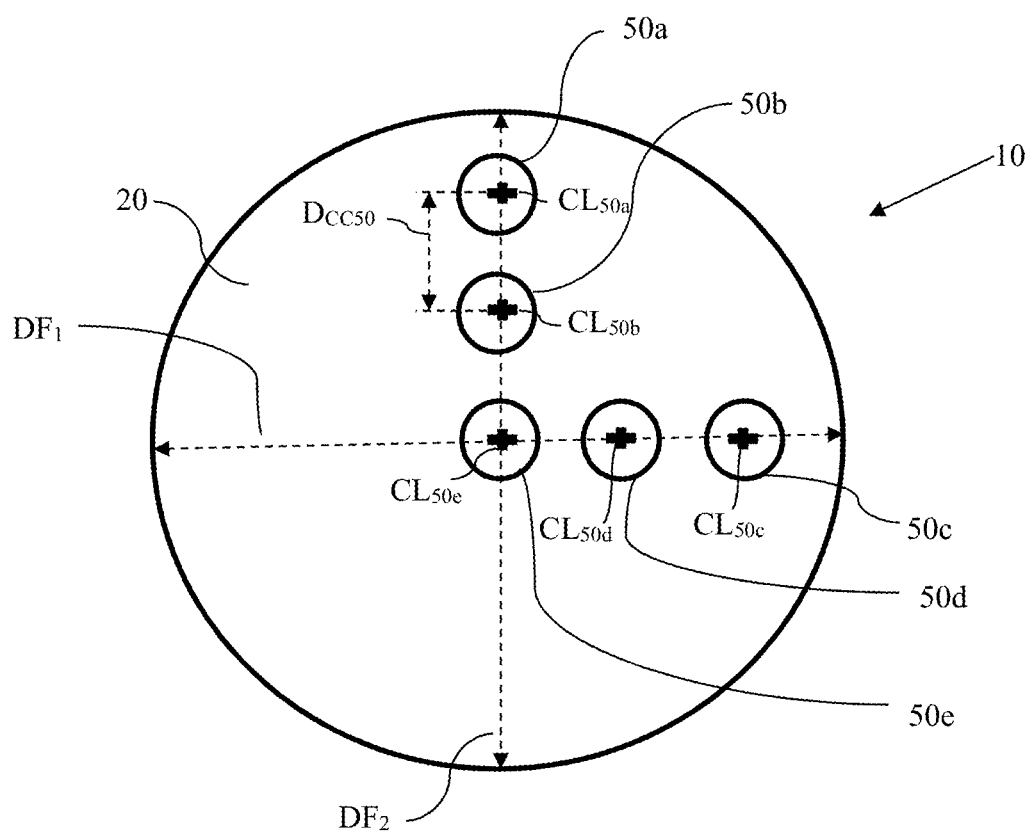

FIG. 7B depicts another exemplary configuration of a multicore fiber 10 having 5 cores 50 within cladding 20. As shown in FIG. 7B, the center of a first core 50a and a second core 50b are positioned along a first diameter DF1 of the fiber 10 with the centerline $CL_{50}$ of each core portion 50 positioned along the first diameter DF1 of the fiber 10. The center of a third core 50c and a fourth core 50d are positioned along a second diameter DF2 of the fiber 10 perpendicularly intersecting the first diameter DF1. The center of a fifth core 50e is positioned at the intersection of the first diameter DF1 and the second diameter DF2 of the fiber 10. The core portions 50 shown in FIG. 7B may be positioned in other suitable arrangements, for example but not limited to an arrangement where each core portion 50 is positioned in a single row with the centerline $CL_{50}$ of each core 50 positioned along a diameter of the fiber 10, forming a one by five liner array of cores.

Figure 7C:
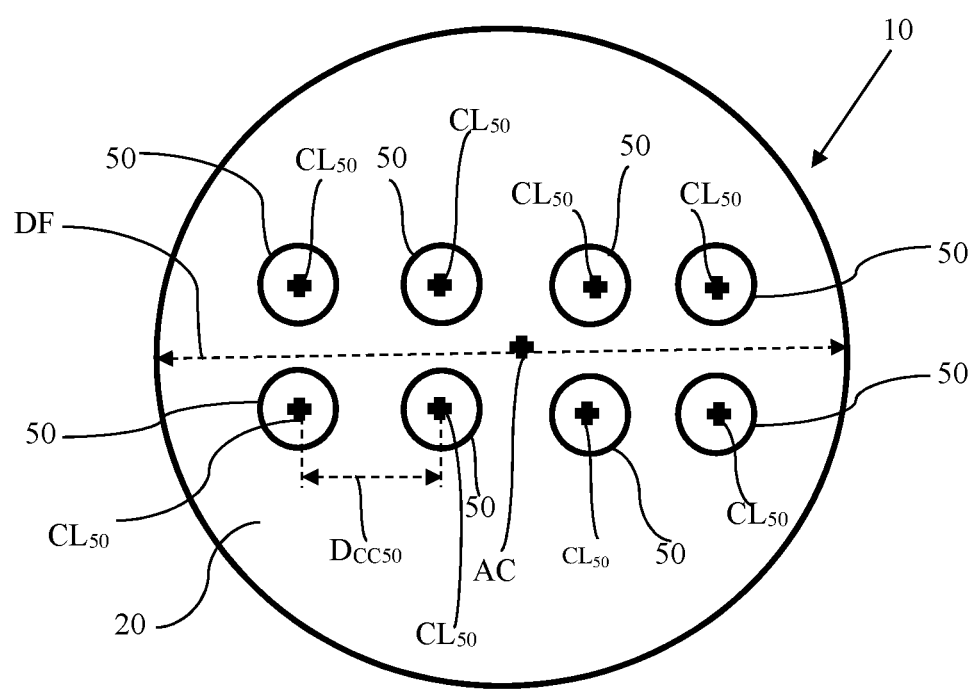

FIG. 7C depicts another exemplary configuration of a multicore fiber 10 having 8 cores 50 within cladding 20. In the embodiment depicted in FIG. 7C the 8 core portions 50 are positioned in a two rows with each row having 4 cores, forming a two by four liner array of cores. The core portions 50 shown in FIG. 7C may be positioned in other suitable arrangements, for example but not limited to an arrangement where each core portion 50 is positioned in a circular pattern formed around the central axis AC of the fiber 10.

Figure 4:
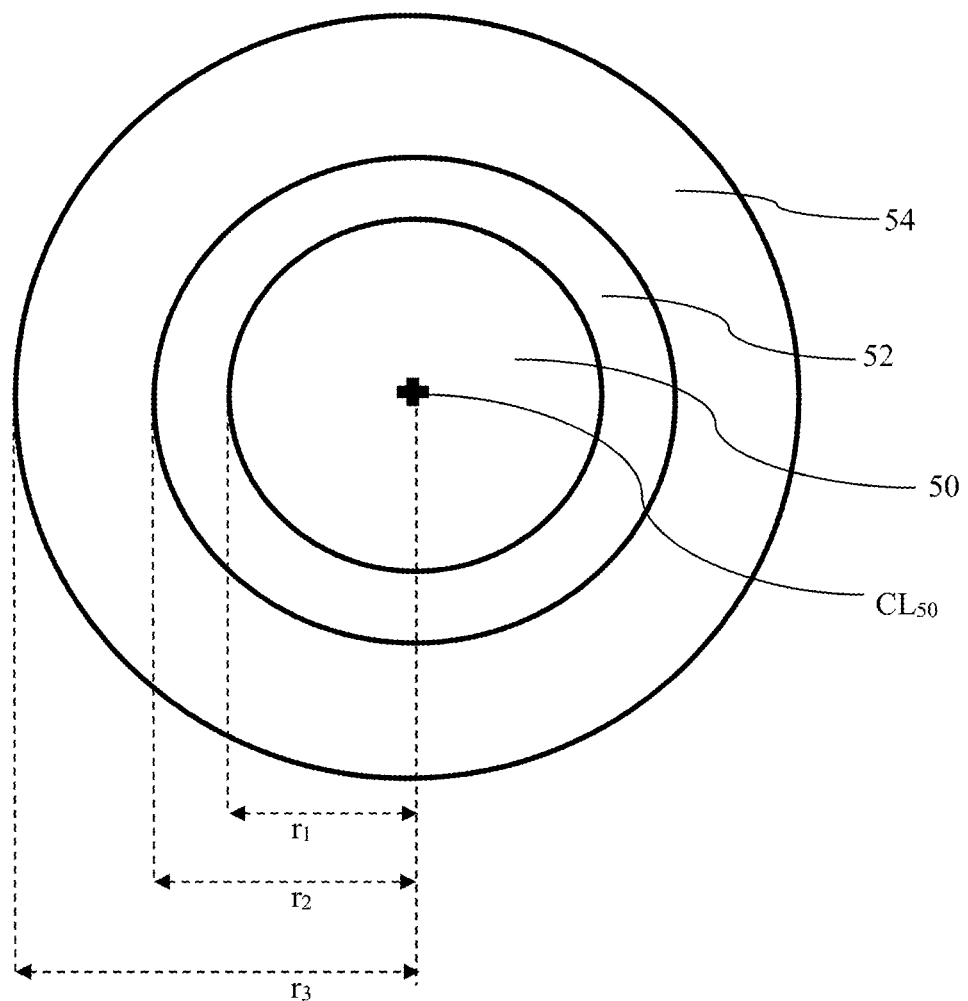
FIG. 4 depicts a core portion, an inner cladding region, and a depressed cladding region of a multicore optical fiber according to one or more embodiments described herein

FIG. 4 schematically depicts a cross sectional view of a core 50 centered on a centerline $CL_{50}$. An inner cladding region 52 (also referred to herein as an inner cladding layer) encircles and directly contacts the core 50 and a depressed cladding region 54 encircles and directly contacts the inner cladding region 52. The depressed cladding region 54 may also be referred to herein as a trench or trench region. The core region 50 has a radius $r_1$ and the depressed cladding region 54 has a radius $r_3$ that defines an outer radius of the core 50 such that $r_3$ corresponds to the radius associated with each core 50. The inner cladding region 52 extends between the radius $r_1$ of the core 50 and an inner radius $r_2$ of the depressed cladding region 54 such that the inner cladding region 52 has a thickness $T2=r_2-r_1$ in the radial direction. The depressed cladding region 54 has a thickness $T3=r_3-r_2$ in the radial direction.

Figure 5A:
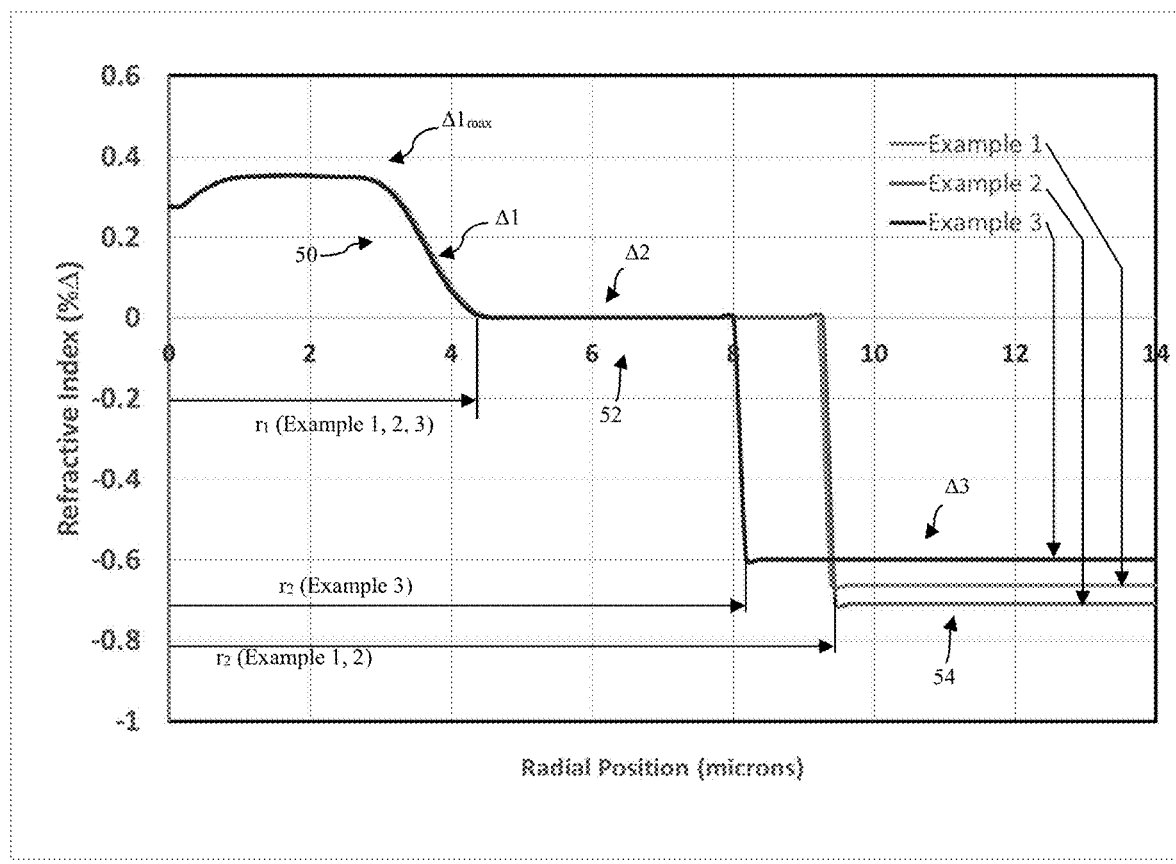
FIG. 5A-5B are refractive index profiles of an exemplary multicore optical fiber, in accordance with some embodiments of the current disclosure.
Figure 5B:
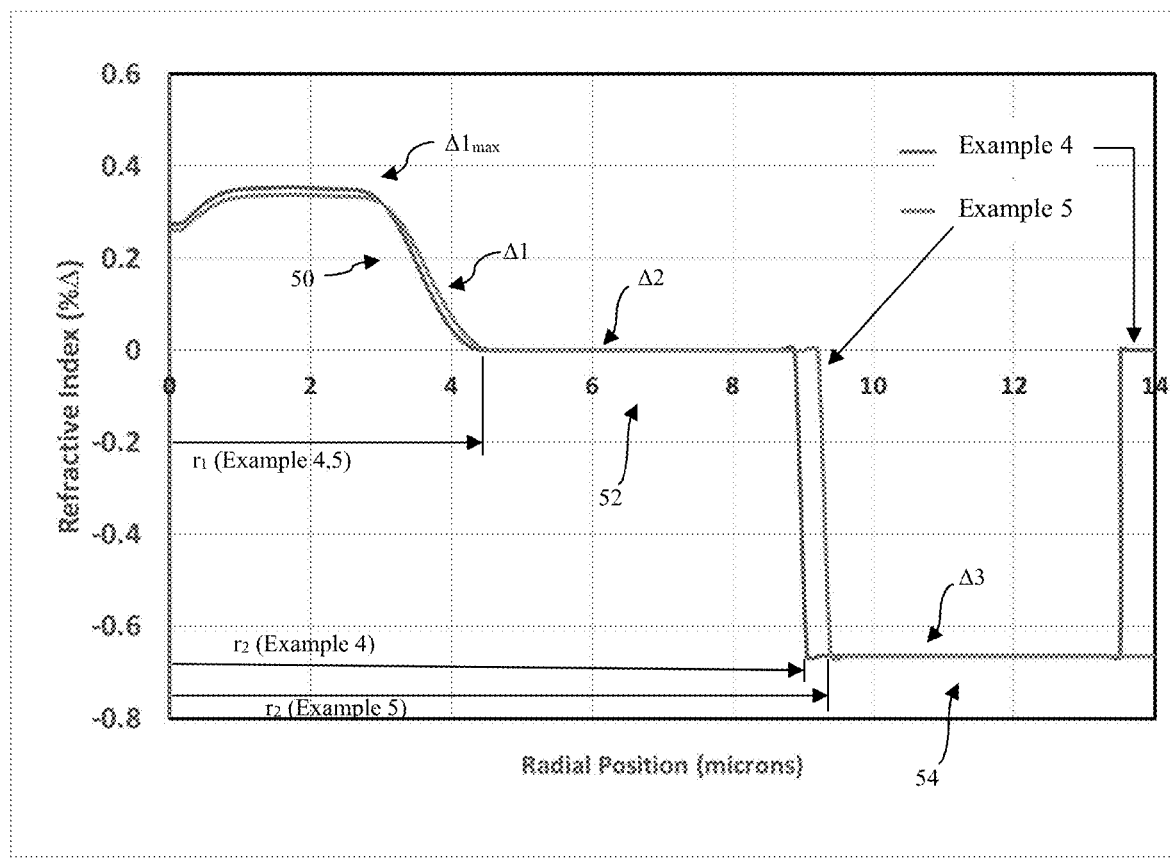

FIG. 5A and FIG. 5B shows refractive index profiles $\Delta(\%)$ versus fiber radius r for five exemplary multicore optical fibers in accordance with some embodiments of the present disclosure. Table 1 below lists optical properties of the exemplary optical fibers shown in FIG. 5A and FIG. 5B.

TABLE 1

Optical Properties of Exemplary Optical Fiber 1-5

| Optical Properties | Example 1 | Example 2 | Example 3 | Example 4 | Example 5 |
|---|---|---|---|---|---|
| MFD at 1310 nm | 8.64 | 8.61 | 8.5 | 8.53 | 8.76 |
| MFD at 1550 nm | 9.72 | 9.71 | 9.42 | 9.62 | 9.85 |
| Cable Cutoff (nm) | 1220 | 1216 | 1220 | 1165 | 1195 |
| Zero Dispersion Wavelength (nm) | 1319 | 1321 | 1311 | 1320 | 1320 |
| Bend at 10 mm Diameter, dB/turn | 0.087 | 0.072 | 0.066 | 0.207 | 0.16 |
| Bend at 15 mm Diameter, dB/turn | 0.025 | 0.021 | 0.019 | 0.053 | 0.042 |
| Bend at 20 mm diameter, dB/turn | 0.006 | 0.005 | 0.0049 | 0.014 | 0.011 |
| Bend at 30 mm diameter, dB/turn | 0.0013 | 0.0016 | 0.0015 | 0.003 | 0.003 |

The relative refractive index profiles depicted in FIG. 5A and FIG. 5B extend radially outward from a centerline $CL_{50}$ of the core 50 and into a portion of the common cladding. The core 50 has a radius $r_1$ and a relative refractive index $\Delta_1$. In some embodiments, radius $r_1$ is about 3.5 microns to 6 microns. In some embodiments, the relative refractive index $\Delta_1$ may vary with radial coordinate (radius) r and be represented as $\Delta_1(r)$. In some embodiments, the core 50 comprises silica-based glass having an up-dopant (e.g., germanium). In some embodiments, the relative refractive index $\Delta_1(r)$ includes a maximum relative refractive index $\Delta_{1max}$ (relative to pure silica). In some embodiments, $\Delta_{1max}$ is greater than or equal 0.2% $\Delta$ and less than or equal to 0.4% $\Delta$. In some embodiments, $\Delta_{1max}$ is greater than or equal 0.3% $\Delta$ and less than or equal to 0.45% $\Delta$.

The inner cladding region 52 extends from radius $r_1$ to a radius $r_2$ such that the inner cladding has a radial thickness $T2=r_2-r_1$. In some embodiments, the inner cladding region 52 comprises a radius $r_2$ and relative refractive index $\Delta_2$. In some embodiments, radius $r_2$ is about 6 microns to about 11 microns. In some embodiments, the inner cladding region 52 is formed from silica-based glass that is substantially free of dopants (e.g., up-dopants and down-dopants) such that the relative refractive index $\Delta_2$ is approximately 0. In embodiments, the inner cladding region 160 is formed from a similar silica-based glass as the common cladding 20 such that $\Delta 2 = \Delta CC$. The depressed cladding region 54 extends from the radius $r_2$ to the radius $r_3$ such that the outer cladding has a radial thickness $T3 = r_3 - r_2$.

In some embodiments, each trench region 54 has radius $r_3$ of less than or equal to 14 microns, preferably less than or equal to 13 microns, more preferably less than or equal to 12.5 microns. A trench radius $r_3$ of less than 14 microns enables the multicore optical fiber 10 to have a higher number of cores 50 while maintaining a 125 micron outer fiber dimension and a mode field diameter greater than about 8.2 microns at 1310 nm, preferably greater than about 8.5 microns at 1310 nm, more preferably larger than 8.6 microns at 1310 nm. In some embodiments, the difference in the mode field diameter at 1310 nm between any two adjacent cores within the glass matrix is less than about 0.3 microns, preferably less than about 0.2 microns, and more preferably less than about 0.1 microns.

The depressed cladding region 54 has a relative refractive index 43. In some embodiments, the relative refractive index 43 is less than or equal to the relative refractive index 42 of the inner cladding region 52 throughout the depressed cladding region 170. The relative refractive index 43 may also be less than or equal to the relative refractive index $\Delta_{CC}$ of the common cladding 20 such that the depressed cladding region 170 forms a trench in the relative refractive index profile of the core 50. In some embodiments, the relative refractive index 43 of the trench region 54, with respect to the cladding, is less than or equal to $-0.6\% \Delta$, preferably less than or equal to $-0.65\% \Delta$, more preferably less than or equal to $-0.7\% \Delta$. In some embodiments, the relative refractive index 43 of the trench region 54, with respect to the cladding, is $-0.6\% \Delta$ to $-0.8\% \Delta$ In some embodiments, the depressed cladding region 54 is constructed to have a down-dopant concentration to achieve a trench volume that is greater than or equal to 50% $\Delta$ micron$^2$, preferably greater than or equal to 55% $\Delta$ micron$^2$, preferably greater than or equal to 60% $\Delta$ micron$^2$, more preferably greater than or equal to 65% $\Delta$ micron$^2$. The trench layer can be used to control the cross-talk between two neighboring cores. Specifically, the low crosstalk between the cores and low bend loss is achieved by having trench volume of greater than or equal to 50% $\Delta$ micron$^2$.

Figure 6:
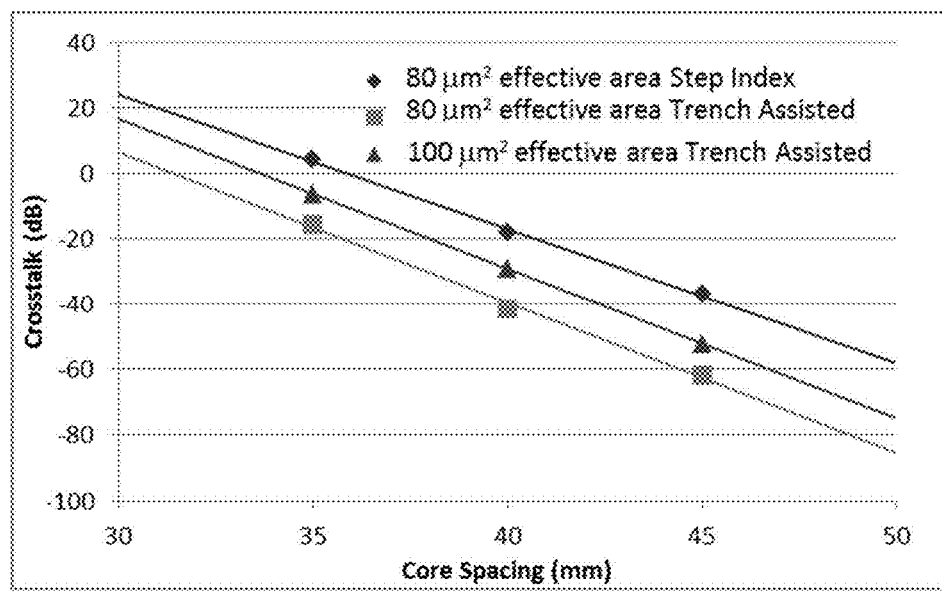
FIG. 6 depicts a graph of cross-talk vs core spacing for an optical fiber in accordance with some embodiments of the current disclosure.

In some embodiments, the cross-talk of the optical fiber is less than about −30 dB, preferably less than about −35 dB, more preferably less than about −40 dB. FIG. 6 depicts a graph of cross-talk vs. core spacing for three optical fiber (an optical fiber having 80 μm$^2$ effective area with a step index core, an optical fiber having 80 μm$^2$ effective area with a step index core and a trench layer positioned between the corresponding core and the glass matrix, and an optical fiber having 100 μm$^2$ effective area with a step index core and a trench layer positioned between the corresponding core and the glass matrix) where the cross-talk decreases as the core spacing of the trench assisted fibers increases.

The optical performance of a fiber optic cable can be measured, for example, by measuring an insertion loss ("loss") through a fiber optic interconnect cable assembly. Insertion loss is a measure of a fraction of the signal light that is lost in the interconnect cable assembly and is, generally, measured in decibels. In general, insertion loss is an undesired result because it results in a weaker optical signal. In some embodiments, a difference in insertion loss at 1310 nm between any two cores within the common cladding is less than about 0.1 dB/km. In some embodiments, a maximum insertion loss at 1310 nm for each core within the common cladding is about 0.32 dB/km to about 0.45 dB/km.

Multicore Fiber Fabrication

The various embodiments of the multicore fibers 10 disclosed herein can be fabricated by using a stack and draw method as is known in the art. First, a glass core blank is prepared, for example by an OVD method. Then glass cores canes with desired diameters and lengths are redrawn from the glass core blank. The core canes are inserted into a large diameter glass tube to form a preform assembly. The tube wall forms a thin layer of outer cladding. Additional outer cladding layer can be added by depositing glass by OVD process. Finally, the preform assembly is drawn into the multicore fiber using a fiber draw tower.

Another method for making the multicore fibers 10 is to use the cane-in-soot method. First, a glass core blank is prepared, for example by an OVD method. Then glass cores canes with desired diameters and lengths are redrawn from the glass core blank. Next, a silica soot tube blank with a large central hole region is made by an OVD method. The core canes are inserted into the central hole region of soot tube to form a canes-in-soot assembly. Then the cane-in-soot assembly is consolidated using a soot consolidation process. During the consolidation process, the soot tube is densified into a glass tube that is collapsed on the glass core canes to form a glass preform assembly. The tube wall forms a thin layer of outer cladding. Additional outer cladding layer can be added by depositing glass by OVD process. Finally, the preform assembly is drawn into the multicore fiber using a fiber draw tower.

It will be apparent to those skilled in the art that various modifications to the preferred embodiments of the disclosure as described herein can be made without departing from the spirit or scope of the disclosure as defined in the appended claims. Thus, the disclosure covers the modifications and variations provided they come within the scope of the appended claims and the equivalents thereto.

Now therefore we claim the following:

1. A circular multicore optical fiber, comprising:
   a glass matrix having a front endface, a back endface, a length, a refractive index $n_{20}$, and a central axis;
   at least 3 cores arranged within the glass matrix, each core having a center positioned along at least one diameter of the glass matrix and wherein any two adjacent cores have a core center to core center spacing of less than 29 microns, wherein the cores are positioned generally parallel to the central axis between the front and back endfaces and having respective refractive indices $n_{50}$, wherein $n_{50} > n_{20}$, wherein each core and the glass matrix define a waveguide; and
   a plurality of trench layers, wherein each trench layer is positioned between a corresponding core and the glass matrix, each trench layer having an outer radius of less than or equal to 14 microns and a trench volume of greater than 50% $\Delta$ micron$^2$;
   wherein the optical fiber has a mode field diameter of greater than about 8.2 microns at 1310 nm, and
   wherein the optical fiber has an outer diameter of less than about 130 microns.

2. The optical fiber of claim 1, wherein the optical fiber comprises 4 cores and wherein the center of each core is positioned along a first diameter of the glass matrix.

3. The optical fiber of claim 1, wherein the optical fiber comprises 5 cores and wherein the center of a first core and a second core are positioned along a first diameter of the glass matrix and wherein the center of a third core and a fourth core are positioned along a second diameter of the glass matrix perpendicularly intersecting the first diameter, and wherein the center of a fifth core is positioned at the intersection of the first diameter and the second diameter.

4. The optical fiber of claim 1, wherein the optical fiber has a diameter of about 125 microns.

5. The optical fiber of claim 1, wherein the plurality of cores is at least 4 cores.

6. The optical fiber of claim 1, wherein the plurality of cores is at least 8 cores.

7. The optical fiber of claim 1, wherein a diameter of each core is about 5 microns to about 27 microns.

8. The optical fiber of claim 1, wherein the optical fiber has a mode field diameter greater than 8.5 microns at 1310 nm.

9. The optical fiber of claim 1, wherein the optical fiber has a mode field diameter greater than 8.6 microns at 1310 nm.

10. The optical fiber of claim 1, wherein the outer radius of each trench layer is less than or equal to about 13 microns.

11. The optical fiber of claim 1, wherein the outer radius of each trench layer is less than or equal to about 12.5 microns.

12. The optical fiber of claim 1, wherein the trench volume is greater than 55% $\Delta$ micron$^2$.

13. The optical fiber of claim 1, wherein the trench volume is greater than 60% $\Delta$ micron$^2$.

14. The optical fiber of claim 1, wherein the trench volume is greater than 65% $\Delta$ micron$^2$.

15. The optical fiber of claim 1, wherein a distance from an edge of the core to an edge of the glass matrix is 4 microns or less.

16. The optical fiber of claim 1, wherein a distance from an edge of the core to an edge of the glass matrix is 3.5 microns or less.

17. The optical fiber of claim 1, wherein a crosstalk of the optical fiber is less than about −30 dB.

18. The optical fiber of claim 1, wherein a crosstalk of the optical fiber is less than about −35 dB.

19. The optical fiber of claim 1, wherein a crosstalk of the optical fiber is less than about −40 dB.

20. The optical fiber of claim 1, wherein a difference in loss at 1310 nm between any two cores within the glass matrix is less than about 0.1 dB/km.

21. The optical fiber of claim 1, wherein a maximum loss at 1310 nm for each core within the glass matrix is about 0.32 dB/km to about 0.45 dB/km.

22. The optical fiber of claim 1, wherein a difference in the mode field diameter between any two cores within the glass matrix at 1310 nm is less than 0.3 microns.

* * * * *

UNITED STATES PATENT AND TRADEMARK OFFICE
CERTIFICATE OF CORRECTION

PATENT NO. : 11,592,613 B2
APPLICATION NO. : 17/381835
DATED : February 28, 2023
INVENTOR(S) : Kevin Wallace Bennett et al.

It is certified that error appears in the above-identified patent and that said Letters Patent is hereby corrected as shown below:

On the Title Page

On the page 2, in item (56), in Column 2, under "Other Publications", Line 12, delete "FiberOptics," and insert -- Fiber Optics, --.

Signed and Sealed this
Fifteenth Day of August, 2023

Katherine Kelly Vidal
*Director of the United States Patent and Trademark Office*